United States Patent
Miyata et al.

[19]

[11] Patent Number: 6,093,096
[45] Date of Patent: Jul. 25, 2000

[54] AIR CONDITIONING APPARATUS FOR A REAR SEAT OF VEHICLE

[75] Inventors: Manabu Miyata, Obu; Haruki Ikuta, Hekinan; Koji Ito; Hikaru Sugi, both of Nagoya; Takuya Natsume, Kariya; Yukio Uemura, Kariya; Kazushi Shikata, Kariya, all of Japan

[73] Assignee: Denso Corporation, Kariya, Japan

[21] Appl. No.: 09/145,911

[22] Filed: Sep. 2, 1998

[30] Foreign Application Priority Data

Sep. 3, 1997 [JP] Japan ................................ 9-238674
Jun. 3, 1998 [JP] Japan ................................ 10-154786

[51] Int. Cl.⁷ .................................................. B60H 1/32
[52] U.S. Cl. ........................ 454/139; 454/156; 454/160; 454/165
[58] Field of Search ............................. 62/244; 454/124, 454/139, 156, 158, 159, 160, 162, 165

[56] References Cited

U.S. PATENT DOCUMENTS 4,476,773 10/1984 Fehr .................................... 454/156 X

FOREIGN PATENT DOCUMENTS 29 37 215 4/1981 Germany ................................ 454/159
52-33850 8/1950 Japan .

Primary Examiner—Harold Joyce
Attorney, Agent, or Firm—Harness, Dickey & Pierce, PLC

[57] ABSTRACT

An air conditioning apparatus for a rear seat of a vehicle includes a centrifugal fan disposed at a downstream air side of an evaporator. The centrifugal fan is a backward curved fan having a plurality of blades each of which is curved backward relative to a rotation direction of the centrifugal fan. In the centrifugal fan, because a main component of velocity vector is in a radial direction of the centrifugal fan, a dynamical-pressure component of air blown from the centrifugal fan can be effectively changed to a hydrostatic-pressure component. Thus, during a cooler mode where air is simultaneously blown from first and second air outlets toward the rear space of the passenger compartment, a pressure of air blown from the first and second air outlets can be increased, and an amount of air blown toward the rear space of the passenger compartment can be sufficiently increased.

29 Claims, 11 Drawing Sheets

VEHICLE LEFT ←→ VEHICLE RIGHT

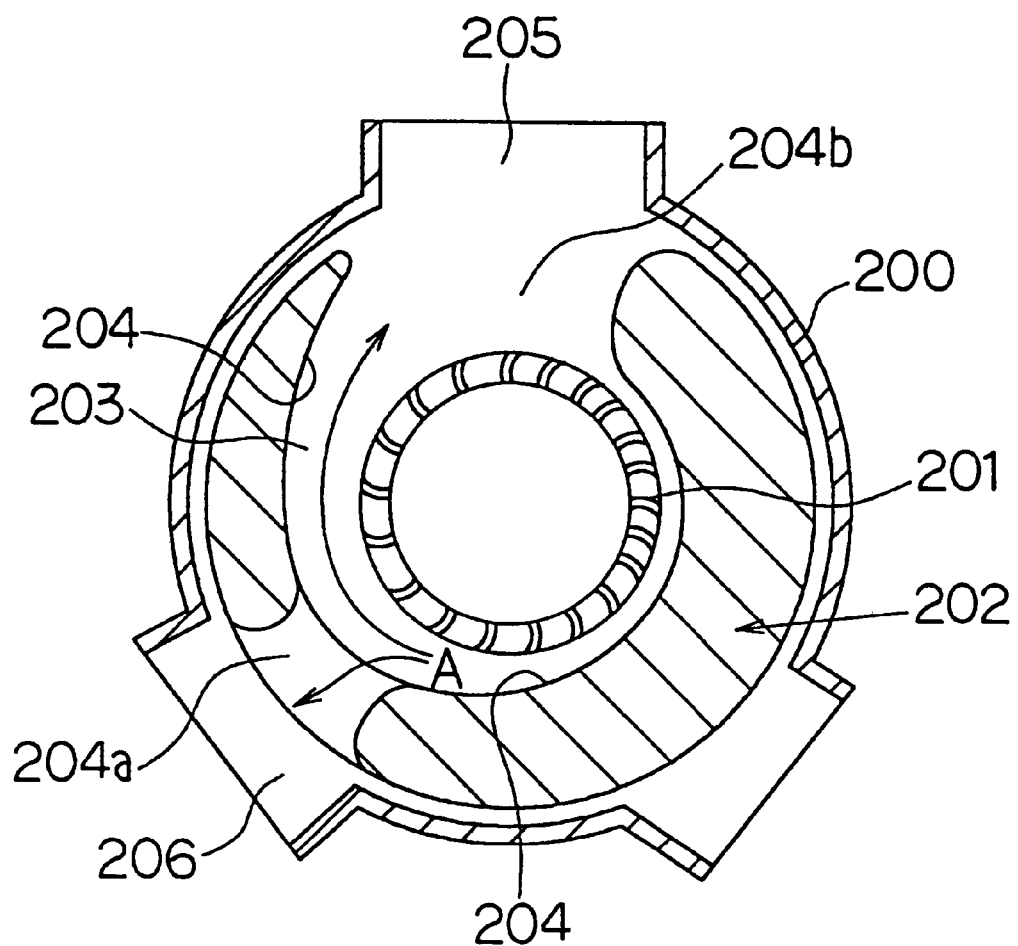

AIR CONDITIONING APPARATUS FOR A REAR SEAT OF VEHICLE

CROSS-REFERENCE TO RELATED APPLICATION

This application is related to and claims priority from Japanese Patent Applications No. Hei. 9-238674 filed on Sep. 3, 1997, and No. Hei. 10-154786 filed on Jun. 3, 1998, the contents of which are hereby incorporated by reference.

BACKGROUND OF THE INVENTION

1. Field of the Invention

The present invention relates to an air conditioning apparatus for a rear seat of a vehicle, more particularly, relates to a blower unit having a centrifugal fan for the air conditioning apparatus.

2. Description of Related Art

A conventional air conditioning apparatus for a vehicle is described in JP-U-52-33850. In the conventional air conditioning apparatus, a sirocco fan 201 is disposed in a cylindrical case 200, as shown in FIG. 14. The sirocco fan 201 is a centrifugal multi-bladed fan having forward curved blades. Between an inner peripheral surface of the case 200 and an outer peripheral surface of the sirocco fan 201, a rotary door 202 is disposed to open and close an air outlet of the case 200. A scroll-shaped air passage 203 where a sectional area is gradually increased is formed between an inner peripheral surface of the rotary door 202 and the outer peripheral surface of the sirocco fan 201. A guide portion 204 is formed on the inner peripheral surface of the rotary door 202. In the conventional air conditioning apparatus, air-blowing energy generated by the sirocco fan 201 is changed from a dynamical-pressure component to a hydrostatic-pressure component by the guide portion 204, so that air-blowing pressure can be increased.

In the conventional air conditioning apparatus, a first opening portion 205 and a second opening portion 206 are respectively formed in the case 200, and an air outlet mode where air is simultaneously blown from both the first opening portion 205 and the second opening portion 206 can be set. Further, the conventional air conditioning apparatus is generally installed in a passenger compartment at a front side, and air is mainly blown from an instrument panel toward a rear side of the vehicle. Thus, in a one-box car having a large passenger compartment, air-conditioning feeling for a passenger seated on a rear seat in the passenger compartment is deteriorated. Therefore, an air conditioning unit for a rear seat in the passenger compartment may be provided. However, in this case, because a long duct is necessary to supply air to an air outlet for blowing air toward the rear seat, ventilation resistance is extremely large and the amount of air blown toward the rear seat in the passenger compartment is reduced.

Further, in the conventional air conditioning apparatus, because the sirocco fan 201 is used, the scroll shaped air passage 203 is necessary to increase the air-blowing pressure. However, since both the opening portions 205, 206 are formed, a complete scroll-shaped air passage cannot be formed relative to both the opening portions 205, 206. Thus, in the conventional air-conditioning apparatus, the pressure of air blown from both the opening portions 205, 206 is insufficient; and therefore, the amount of air blown from both opening portions 205, 206 becomes insufficient.

SUMMARY OF THE INVENTION

In view of the foregoing problems, it is a first object of the present invention to provide an air conditioning apparatus for a vehicle, in which air can be simultaneously blown from both air outlets toward a passenger compartment of the vehicle with a sufficient pressure and a sufficient amount.

It is a second object of the present invention to provide a blower unit including a centrifugal fan having a plurality of backward curved blades, in which air can be simultaneously blown from both air outlets of a case to have a sufficient air-blowing pressure.

According to the present invention, an air conditioning apparatus for a vehicle includes a case for forming an air passage, and a centrifugal fan having a plurality of blades and a circular outer peripheral portion. The centrifugal fan is disposed in the case, and the case has at least first and second air outlets for blowing air toward the passenger compartment. In the air conditioning apparatus, the first and second air outlets can be opened simultaneously so that air is blown from both first and second air outlets toward the passenger compartment during an air outlet mode, and the centrifugal fan is a backward curved fan in which each blade is curved backward relative to a rotation direction of the centrifugal fan. Because the centrifugal fan is a backward curved fan in the air conditioning apparatus of the present invention, a main component of a velocity vector is in a radial direction of the fan. Thus, the direction of the main component of the velocity vector of air flow is greatly different from that in a forward curved fan. That is, in the forward curved fan (sirocco fan), the main component of the velocity vector is on a tangential line of an outline (circular) of the fan. Accordingly, in the air conditioning apparatus where air can be simultaneously blown from both air outlets toward a passenger compartment of the vehicle, the hydrostatic-pressure component of blown-air can be readily increased, a pressure loss can be made smaller even if the air passage is a complex passage, and a sufficient amount of air can be blown toward the passenger compartment of the vehicle.

Preferably, a rotary door including a peripheral wall having a circular arc shape in cross section is disposed in the case at an outer side of the outer peripheral portion of the centrifugal fan, and the rotary door rotates in the circumference direction to change an air-blowing direction from the centrifugal fan. Further, a guide portion is disposed on an inner peripheral surface of the peripheral wall of the rotary door to be rotated integrally with the peripheral wall, and the guide portion is disposed in such a manner that a sectional area of an air-blowing passage between the inner peripheral surface of the peripheral wall and the outer peripheral portion of the centrifugal fan is gradually increased along the air-blowing direction. Thus, noise of air blown from the centrifugal fan can be reduced.

More preferably, the rotary door opens both the first and second air outlets in such a manner that air is blown from both the first and second air outlets during the air outlet mode, the first and second air outlets are formed in the case to have a predetermined interval therebetween in the circumference direction of the centrifugal fan, and air is blown from the centrifugal fan in an air-blown range having a first air-blown range and a second air-blown range. The air-blowing passage between the inner peripheral surface of the peripheral wall and the outer peripheral portion of the centrifugal fan is divided into a first air-blowing passage and a second air-blowing passage by the rotary door and the guide portion, in such a manner that air blown from the first air-blown range is introduced into the first air outlet through the first air-blowing passage and air blown from the second air-blown range is introduced into the second air outlet through the second air-blowing passage, during the air outlet mode. Thus, air independently flows through the first air passage and the second air passage before air is blown from the first and second air outlets. As a result, the noise of air blown from the centrifugal fan can be further reduced.

Still more preferably, the rotary door is rotated to adjust a ratio between an amount of air blown from the first air outlet and an amount of air blown from the second air outlet during the air outlet mode. Therefore, air-conditioning feeling for a passenger in the passenger compartment can be improved.

BRIEF DESCRIPTION OF THE DRAWINGS

Additional objects and advantages of the present invention will be more readily apparent from the following detailed description of preferred embodiments when taken together with the accompanying drawings, in which:

FIG. 14 is a schematic diagram showing a conventional blower unit.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be now described. The first embodiment of the present invention is applied to an air conditioning apparatus for a rear seat of a vehicle, for controlling air to be blown toward a rear seat side (i.e., rear space) in a passenger compartment of the vehicle. In the first embodiment, the air conditioning apparatus 1 is a manual type in which an air outlet mode is manually selected and the temperature of blown-air is manually adjusted by a passenger in the passenger compartment.

Figure 1:
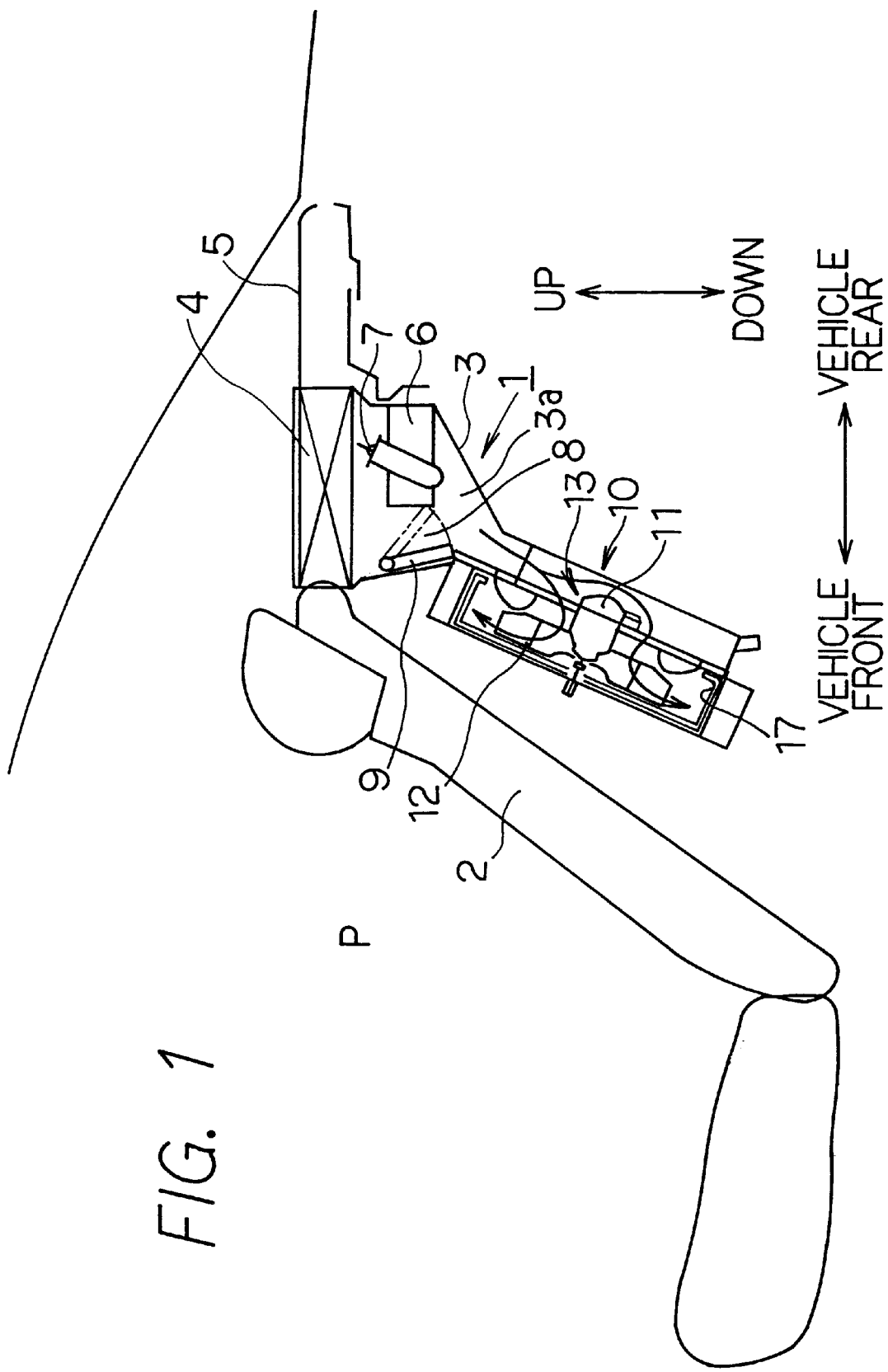
FIG. 1 is a schematic diagram showing an air conditioning apparatus for a rear seat of a vehicle according to a first preferred embodiment of the present invention.

As shown in FIG. 1, the air conditioning apparatus 1 is disposed in the passenger compartment on a rear side of a rear seat 2 at a front position of a trunk of the vehicle. Further, the air conditioning apparatus 1 for the rear seat is disposed at a right rear-seat side in a width direction (i.e., right-left direction) of the vehicle. The air conditioning apparatus 1 includes a case 3, made of polypropylene, for forming an air passage 3a toward a rear space P of the vehicle.

A rectangular filter member 4 for filtering dust contained in air and for removing malodorous components is disposed in the case 3 at an upstream air side. In the first embodiment, a material and a structure of the filter member 4 may be arbitrarily set. The filter member 4 is disposed at a vehicle rear side of the rear seat 2 of the passenger compartment, and an air inlet of the filter member 4 is opened at an upper side of a rear package tray 5 to which a speaker of a radio is generally attached.

An evaporator (i.e., cooling heat exchanger) 6 is disposed approximately horizontally at a lower side of the filter member 4. The evaporator 6 is a part of a refrigerant cycle, and the refrigerant cycle includes a compressor for compressing refrigerant, a condenser, an expansion valve 7 and the evaporator 6. In the refrigerant cycle of the first embodiment, a low-pressure rear refrigerant circuit including the evaporator 6 and the expansion valve 7 is formed in parallel with a low-pressure front refrigerant circuit including an evaporator and an expansion valve for a front seat, between the condenser and the compressor.

Figure 2:
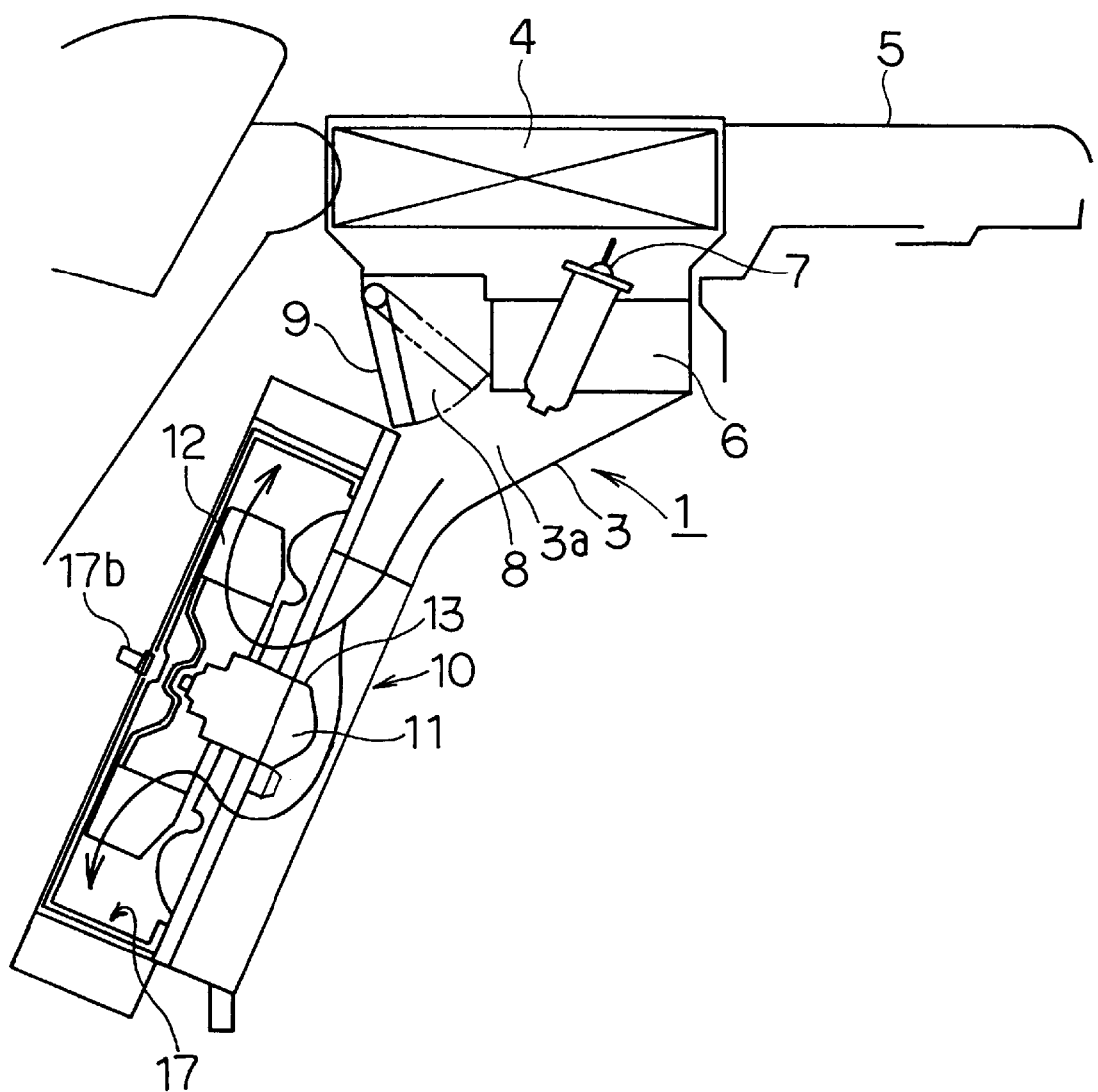
FIG. 2 is a partly enlarged view of the air conditioning apparatus in FIG. 1.

As shown in FIGS. 1 and 2, the evaporator 6 is disposed in the air passage 3a within the case 3 at a vehicle rear side of the rear seat 2 to form a bypass passage 8 through which air bypasses the evaporator 6. An air mixing door 9 for adjusting a ratio between an amount of air passing through the evaporator 6 and an amount of air passing through the bypass passage 8 is formed in the bypass passage 8. In the first embodiment, the air mixing door 9 adjusts the ratio of the amount of air passing through the evaporator 6 and the amount of air passing through the bypass passage 8 to control the temperature of air blown toward the rear space P in the passenger.

Figure 3:
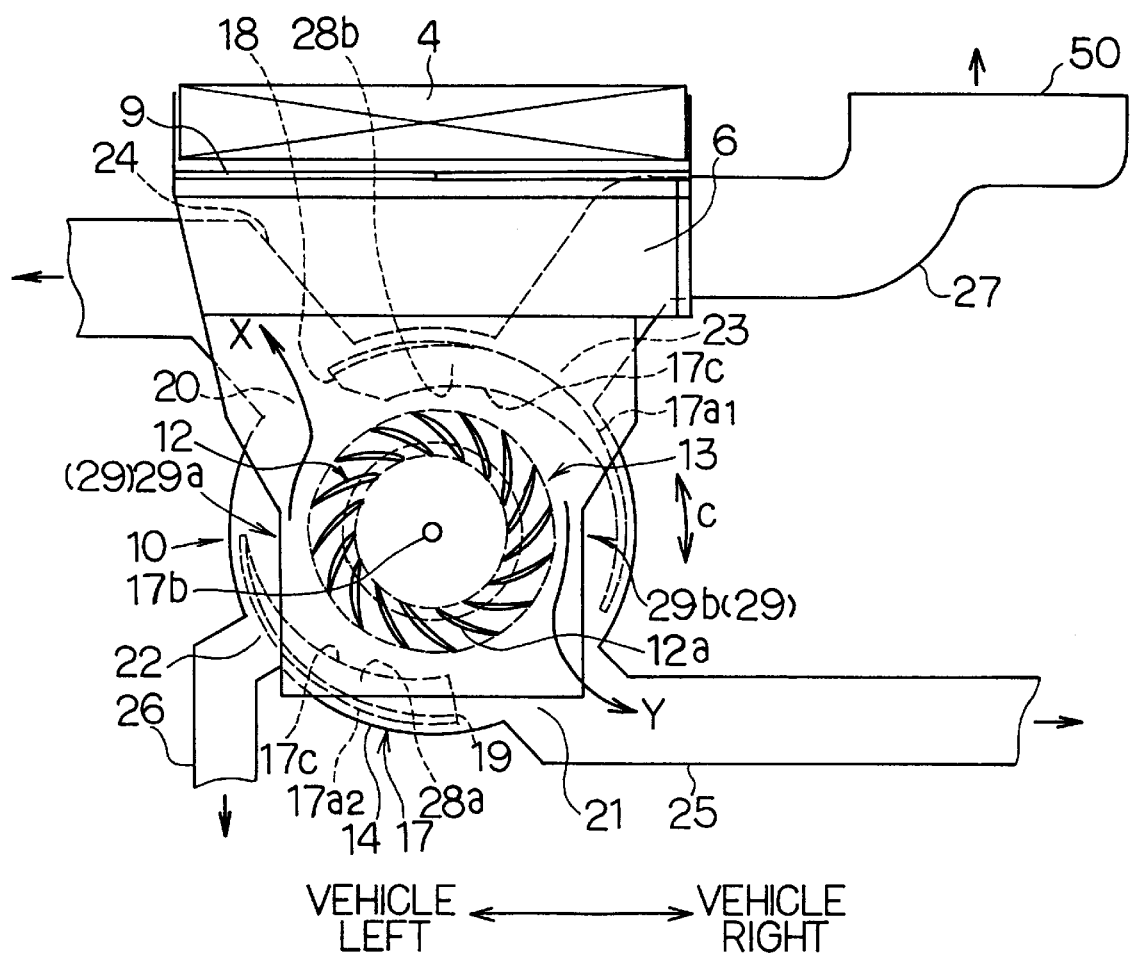
FIG. 3 is a side view of the air conditioning apparatus when viewed from a vehicle rear side toward a vehicle front side in FIG. 1.
Figure 4:
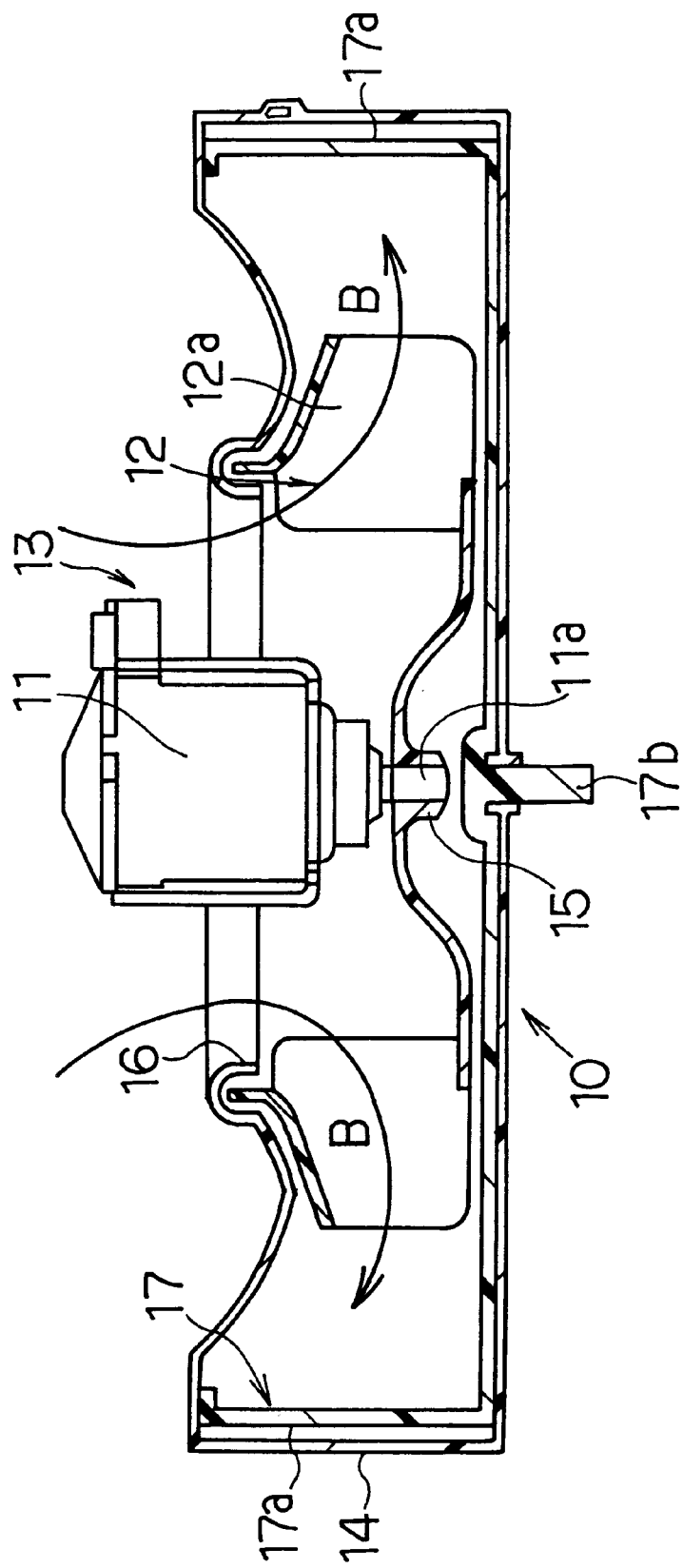
FIG. 4 is a detail view of a blower unit of the air conditioning apparatus according to the first embodiment.

A blower unit 10 is disposed in the case 3 on a downstream air side of the evaporator 6 and the air mixing door 9 at a lower side of the evaporator 6 and the air mixing door 9. As shown in FIGS. 3 and 4, the blower unit 10 includes a cylindrical cup-like blower case portion 14, and a centrifugal fan 13 accommodated in the blower case portion 14. The blower case portion 14 is made of resin such as polypropylene. An air suction port 16 of the centrifugal fan 13 is formed at a cup-like opening side of the blower case portion 14. The air suction port 16 of the centrifugal fan 13 is formed in a bell-mouth shape to rectify a flow of air sucked into the blower case portion 14 and to reduce a suction noise and a suction resistance of air.

Air having passed through the filter member 4 is sucked into the blower case portion 14 from the air suction port 16. As shown in FIG. 3, a first air outlet 20, a second air outlet 21, a third air outlet 22 and a fourth air outlet 23 are formed in a peripheral wall of the blower case portion 14 to have a predetermined space between the air outlets 20–23 in a circumference direction of the centrifugal fan 13. That is, each angle formed by the air outlets 20–23 relative to a rotation center (rotary shaft 17b) of the centrifugal fan 13 is approximately 90°. The air outlets 20–23 are for blowing air toward a predetermined position of the vehicle.

The first air outlet 20 is for blowing air toward a passenger seated on a left rear seat, and communicates with a left-side rear air outlet through a first duct 24. The second air outlet 21 is for blowing air toward a passenger seated on a right rear seat, and communicates with a right-side rear air outlet through a second duct 25. The third air outlet 22 is for discharging inside air (i.e., air inside the passenger compartment) to the outside of the passenger compartment through a third duct 26. Actually, inside air is discharged into a trunk room through the third air outlet 22 and the third duct 26. The fourth air outlet 23 is for blowing air having passed through the filter member 4 into the passenger compartment again through a fourth duct 27. An air outlet 50 at the top end of the fourth duct 27 is opened into the rear package tray 5 of the vehicle.

As shown by arrow B in FIG. 4, the centrifugal fan 13 is a centrifugal type in which air is sucked from a rotation axial direction and is blown out in a radial direction thereof. Further, the centrifugal fan 13 is a backward curved fan having a plurality of blades 12a each of which is curved relative to a rotation direction R of the centrifugal fan 13. The centrifugal fan 13 is composed of a fan 12 where the blades 12a are arranged in a circular shape and an electrical motor 11 for driving the fan 12. As shown in FIG. 4, a boss portion 15 is formed integrally with the fan 12, at a rotation center portion of the fan 12, and a driving shaft 11a of the electric motor 11 is inserted into the boss portion 15. Further, as shown in FIG. 4, the electric motor 11 is inserted into the air suction port 16.

A rotary door 17 for changing a flow direction of air blown from the centrifugal fan 13 is disposed within the blower case portion 14 at an outside of the outer peripheral portion of the centrifugal fan 13. The rotary door 17 is made of resin such as polypropylene, and has a cylindrical cup shape, as shown in FIG. 4. A rotary shaft 17b is formed integrally with the rotary door 17 at a center portion of the bottom of the cup-shaped rotary door 17. The rotary shaft 17b is coupled with an operation panel through a link mechanism. Therefore, by a manual operation of the operation panel by a passenger in the passenger compartment, the rotary door 17 rotates in directions shown by C in FIG. 3.

As shown in FIG. 3, a first opening portion 18 and a second opening portion 19 are formed in the peripheral wall of the rotary door 17 symmetrically relative to a center portion of the cylindrical rotary door 17. The rotary door 17 has peripheral wall portions 17a1 and 17a2 formed in a circular arc shape in cross-section. The peripheral wall portions 17a1, 17a2 open and close the air outlets 20–23 to change the blowing direction of air. Air generated in the centrifugal fan 13 is blown toward the rear space P of passenger compartment or is discharged to the outside of the passenger compartment through the first and second opening portions 18, 19 of the rotary door 17.

The rotary door 17 will be described in detail with reference to FIG. 3. A guide portion 28b is formed integrally with an inner peripheral side of the peripheral wall portion 17a1 to be rotated integrally with the peripheral wall portion 17a1. Further, a guide portion 28a is formed integrally with an inner peripheral side of the peripheral wall portion 17a2 to be rotated integrally with the peripheral wall portion 17a2. When the guide portion 28a is formed integrally with the peripheral wall portion 17a2, the guide portion 28a may be formed in hollow to reduce the weight of the blower unit 10 and to produce the blower unit 10 in low cost. Similarly, the guide portion 28b may be formed in hollow.

An air passage 29 is formed between inner surfaces 17c of the peripheral wall portions 17a1, 17a2 and the outer peripheral portion of the centrifugal fan 13. The guide portions 28a, 28b are provided to increase a sectional area of air passage 29 along the flow direction of air blown from the centrifugal fan 13. Further, as shown in FIG. 3, the air passage 29 is formed in a scroll shape by the guide portions 28a, 28b, and the air passage 29 is partitioned by the guide portions 28a, 28b into a first air passage 29a and a second air passage 29b. That is, in the first embodiment, the first air passage 29a and the second air passage 29b are independently formed.

Figure 5:
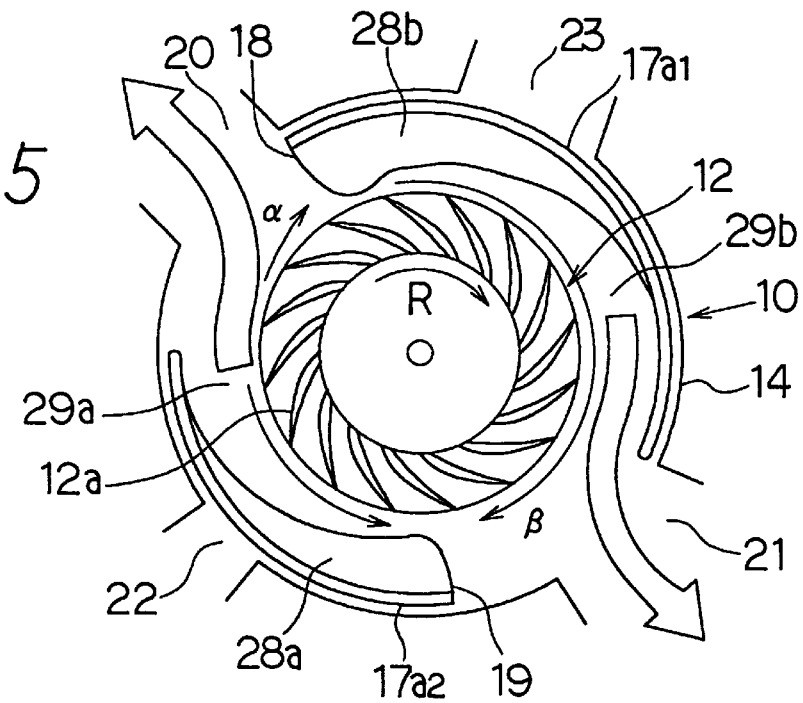
FIG. 5 is a schematic diagram of the blower unit during a first cooler mode according to the first embodiment.

In the first embodiment, as shown in FIG. 3, air generated in the centrifugal fan 13 can flows through both the first and second air outlets 20, 21 during an air outlet mode. During the air outlet mode, air can be blown simultaneously from both first and second air outlets 20, 21, and the guide portions 28a, 28b have the following functions. For example, when a first cooler mode is set as shown in FIG. 5, air blown from a first predetermined area shown by arrow a in FIG. 5, within an entire air-blown area of the centrifugal fan 13, is blown toward the first air outlet 20 through the first air passage 29a. On the other hand, during the first cooler mode, air blown from a second predetermined area shown by arrow β in FIG. 5, within the entire air-blown area of the centrifugal fan 13, is blown toward the second air outlet 21 through the second air passage 29b.

That is, as shown in FIG. 5, the first air passage 29a extends from a forward side of the second air outlet 21 in the rotation direction R, proximate to the second air outlet 21, toward a backward side of the first air outlet in the rotation direction R, proximate of the first air outlet 20. On the other hand, the second air passage 29b extends from a forward side of the first air outlet, proximate to the first air outlet 20, toward a backward side of the second air outlet 21, proximate to the second air outlet 21, in the rotation direction R of the centrifugal fan 13. Further, in the first embodiment, the first and second air passages 29a, 29b are formed in such a manner that a sectional area of the second air passage 29b at an upstream air side is smaller than a sectional area of the first air passage 29a at a downstream air side, and the sectional area of the first air passage 29a at an upstream air side is smaller than the sectional area of the second air passage 29b at a downstream air side. That is, a sectional area of the most upstream air side of the second air passage 29b is smaller than a sectional area of the downstream air side of the first air passage 29a, and a sectional area of the most upstream air side of the first air passage 29a is smaller than a sectional area of the most downstream air side of the second air passage 29a. Each sectional area of the first and second air passages 29a, 29b is gradually increased from an upstream air side toward a downstream air side thereof.

The air outlet mode can be changed by the rotary door 17. The air outlet mode due to the rotary door 17 will be explained with reference to FIGS. 5–9.

(1) First Cooler Mode

As shown in FIG. 5, during the first cooler mode, the peripheral wall portion 17a1 closes the fourth air outlet 23, the peripheral wall portion 17a2 closes the third air outlet 22, the first opening portion 18 is overlapped with the first air outlet 20 to fully open the first air outlet 20, and the second opening portion 19 is overlapped with the second air outlet 21 to fully open the second air outlet 21. Therefore, air generated in the first predetermined area a of the centrifugal fan 13 is smoothly gathered by the guide portion 28a while flowing through the first air passage 29a, and is blown toward the first air outlet 20 while dynamical-pressure component of air is changed to hydrostatic-pressure component of air. Thus, air-blowing noise can be reduced in the first air outlet 20. Further, air generated in the second predetermined area β of the centrifugal fan 13 is smoothly gathered by the guide portion 28b while flowing through the second air passage 29b, and is blown toward the second air outlet 21 while the dynamical-pressure component of air is changed to the hydrostatic-pressure component of air. Thus, air-blowing noise can be reduced in the second air outlet 21.

In the first embodiment, because the sectional area of the upstream air side of the second air passage 29b is smaller than the sectional area of the downstream air side of first air passage 29a, air in the first air passage 29b is smoothly blown out from the first air outlet 20 without flowing through the second air passage 29b. Further, because the sectional area of the upstream air side of the first air passage 29a is smaller than the sectional area of the downstream air side of the second air passage 29a, air in the second air passage 29b is smoothly blown out from the second air passage 21 without flowing through the first air passage 29a. That is, because air in the first air passage 29a and air in the second air passage 29b independently smoothly flow, air-blowing noise can be further reduced as compared with a case where air generated in the centrifugal fan 13 is divided into two air flows.

In the first embodiment, the air conditioning apparatus 1 for the rear seat of the vehicle is disposed in the passenger compartment at a rear side of the rear seat 2. However, in the first embodiment, because the centrifugal fan 13 is the backward curved fan, the hydrostatic-pressure component of air can be readily increased as compared with a case where the centrifugal fan 13 is a forward curved fan (sirocco fan). Therefore, a pressure loss due to a curve of the air outlet of the centrifugal fan 13 is hardly affected, and a sufficient amount of air can be blown toward the rear space P in the passenger compartment even when the air conditioning apparatus 1 is disposed at the rear side of the rear seat 2 in the passenger compartment.

In the backward curved fan such as the centrifugal fan 13 of the first embodiment, a direction of main component of a velocity vector of air flow is greatly different from that in the forward curved fan. That is, in the forward curved fan (sirocco fan), the main component of the velocity vector is on a tangential line of an outline (circular) of the fan. On the other hand, in the backward curved fan, the main component of the velocity vector is on a radial direction of the fan. Therefore, the hydrostatic-pressure component becomes larger in the backward curved fan.

Further, in the first embodiment, because the blown-air energy due to the centrifugal fan 13 is changed from the dynamical-pressure component to the hydrostatic-pressure component by the guide portions 28a, 28b, the pressure of air blown from the centrifugal fan 13 is further increased. As a result, the amount of air blown toward the rear area P in the passenger compartment can be sufficiently increased.

Figure 10:
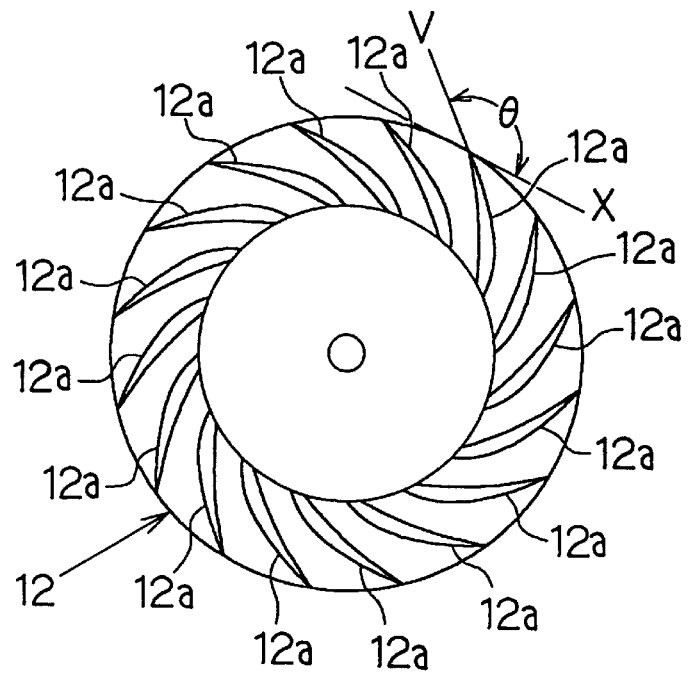
FIG. 10 is a diagrammatic view for defining an outlet angle of a centrifugal fan of the blower unit according to the first embodiment.

Further, in the first embodiment of the present invention, an outlet angle θ of each blade 12a of the backward curved fan (i.e., the centrifugal fan 13) is defined as shown in FIG. 10. That is, as shown in FIG. 10, the outlet angle θ of each blade 12a is an angle between a tangential line X of a circular rotation locus of a top end of the blade 12a and an extending line V of the top end of the blade 12a. When the outlet angle θ is in a range of 90°–150°, a sufficient pressure of blown-air can be obtained in the centrifugal fan 13. In the first embodiment, the outlet angle θ is set at 142°.

During the first cooler mode, both the first air outlet 20 and the second outlet 21 are fully opened, and the first air outlet 20 and the second air outlet 21 are positioned symmetrically relative to the rotation center of the centrifugal fan 13. Therefore, the amount of air blown from the first air outlet 20 can be readily set to be equal to the amount of air blown from the second air outlet 21. Thus, during the first cooler mode, the amount of air blown toward the left rear-seat side in the passenger compartment can be readily made equal to the amount of air blown toward the right rear-seat side in the passenger compartment, during the first cooler mode.

(2) Second Cooler Mode

Figure 6:
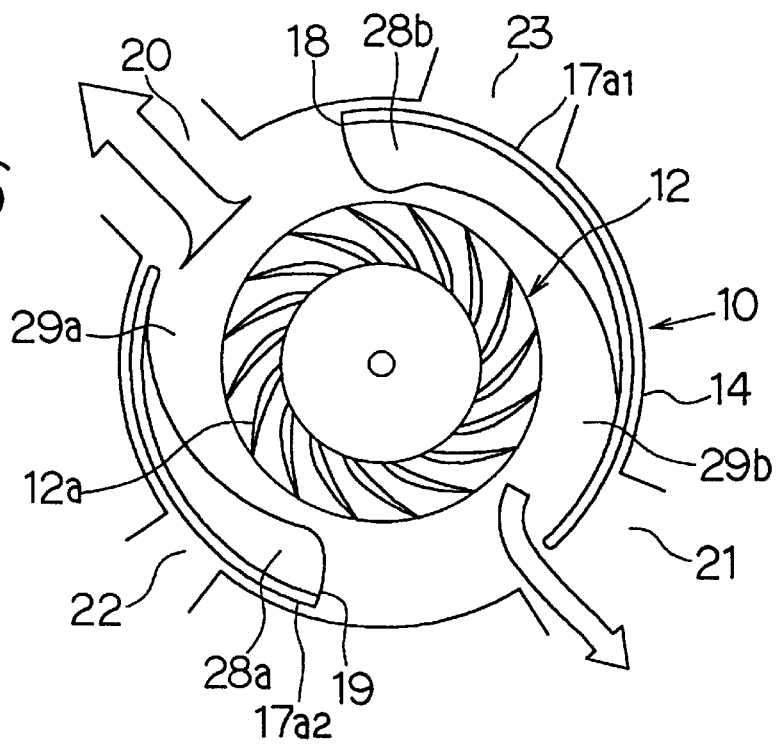
FIG. 6 is a schematic diagram of the blower unit during a second cooler mode according to the first embodiment.

During the second cooler mode, the rotary door 17 is slightly rotated by a passenger clockwise from the state shown in FIG. 5 to the state shown in FIG. 6. As shown in FIG. 6, during the second cooler mode, the peripheral wall portions 17a1, 17a2 of the rotary door 17 respectively close the third air outlet 22 and the fourth air outlet 23. Further, the first air outlet 20 is fully opened and the second air outlet 21 is slightly opened by the opening portions 18, 19 of the rotary door 17. Thus, the amount of air blown from the first air outlet 20 is increased relative to the amount of air blown from the second air outlet 21. In the first embodiment, the ratio between the amount of air blown from the first air outlet 20 and the amount of air blown from the second air outlet 21 is set at ⅝. As a result, during the second cooler mode, the amount of air blown toward the left rear-seat side in the passenger compartment can be made larger than the amount of air blown toward the right rear-seat side in the passenger compartment. That is, the amount of air blown from the first air outlet 20 and the amount of air blown from the second air outlet 21 can be adjusted by the rotation of the rotary door 17. Therefore, when a passenger is seated on the left rear-seat and no passenger is seated on the right rear-seat in the passenger compartment, it is not necessary to supply a large amount cool air toward the right rear-seat side in the passenger compartment. In this case, because the amount of air blown from the first air outlet 20 is made larger than that from the second air outlet 21, air-conditioning feeling for the passenger seated on rear seat in the passenger compartment can be improved.

The operation effect of the guide portions 28a, 28b are similar to that during the first cooler mode. Further, the other portions during the second cooler mode are similar to those during the first cooler mode, and the explanation thereof is omitted.

(3) Third Cooler Mode

Figure 7:
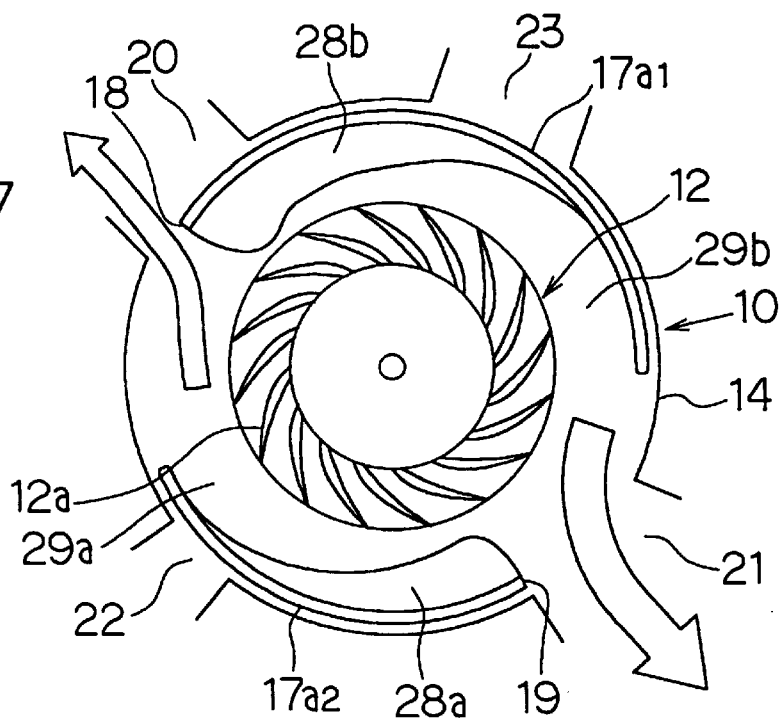
FIG. 7 is a schematic diagram of the blower unit during a third cooler mode according to the first embodiment.

During the third cooler mode, as shown in FIG. 7, be rotary door 17 is rotated by a passenger counterclockwise from the state shown in FIG. 5 to the state shown in FIG. 7. As shown in FIG. 7, during the third cooler mode, the peripheral wall portions 17a1, 17a2 of the rotary door 17 respectively close the third air outlet 22 and the fourth air outlet 23. Further, the first air outlet 20 is slightly opened and the second air outlet 21 is fully opened by the opening portions 18, 19 of the rotary door 17. Thus, the amount of air blown from the first air outlet 20 is decreased relative to the amount of air blown from the second air outlet 21. In the first embodiment, the ratio between the amount of air blown from the first air outlet 20 and the amount of air blown from the second air outlet 21 is set at ⅖. As a result, during the third cooler mode, the amount of air blown toward the left rear-seat side in the passenger compartment can be made smaller than the amount of air blown toward the right rear-seat side in the passenger compartment. That is, the amount of air blown from the first air outlet 20 and the amount of air blown from the second air outlet 21 can be adjusted by the rotation of the rotary door 17. Therefore, when a passenger is seated on the right rear-seat and no passenger is seated on the left rear-seat, it is not necessary to supply a large amount cool air toward the left rear-seat side in the passenger compartment. In this case, because the amount of air blown from the second air outlet 21 is made larger than that from the first air outlet 20, air-conditioning feeling for the passenger seated on rear seat in the passenger compartment can be improved.

The operation effect of the guide portions 28a, 28b are similar to that during the first cooler mode. Further, the other portions during the third cooler mode are similar to those during the first cooler mode, and the explanation thereof is omitted.

(4) Exhaust Mode

Figure 8:
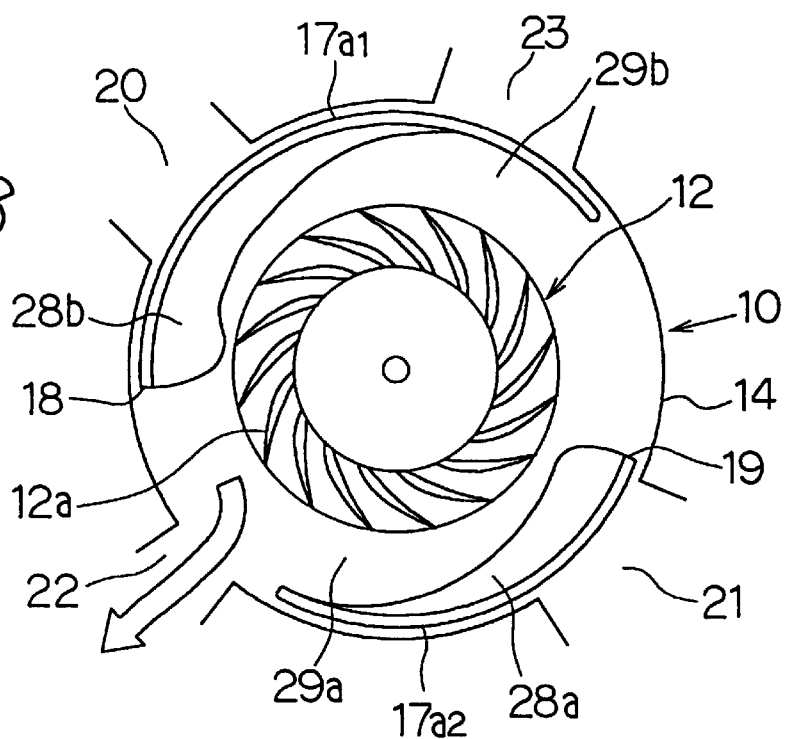
FIG. 8 is a schematic diagram of the blower unit during an exhaust mode according to the first embodiment.

During the exhaust mode, as shown in FIG. 8, the rotary door 17 is rotated by a passenger counterclockwise from the state shown in FIG. 7 to the state shown in FIG. 8. As shown in FIG. 8, during the exhaust mode, the peripheral wall portion 17a1 of the rotary door 17 closes both the first air outlet 20 and the fourth air outlet 23, the peripheral wall portion 17a2 of the rotary door 17 fully closes the second air outlet 21 to fully open the third air outlet 22. That is, during the exhaust mode, only the third air outlet 22 is fully opened, while the first air outlet 20, the second air outlet 21 and the fourth air outlet 23 are closed. Therefore, inside air having passed through the filter member 4 is introduced into the case 3, and is discharged to the outside of the passenger compartment through the third air outlet 22 and the air duct 26 to perform ventilation of the passenger compartment. Thus, during the exhaust mode, the passenger compartment is ventilated.

(5) Air-Cleaning Mode

Figure 9:
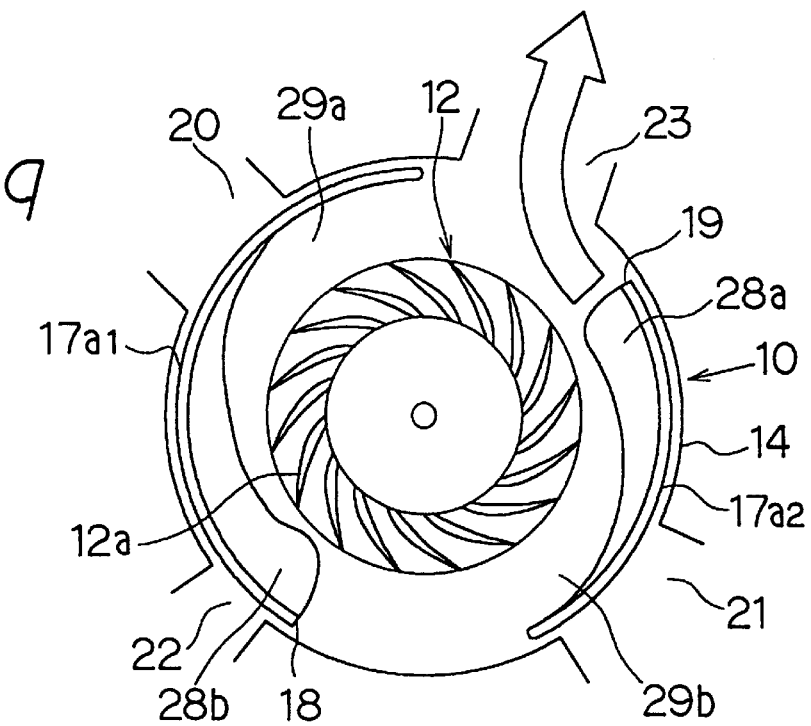
FIG. 9 is a schematic diagram of the blower unit during an air-cleaning mode according to the first embodiment.

During the air-cleaning mode, the rotary door 17 is rotated by a passenger counterclockwise from the state shown in FIG. 8 to the state shown in FIG. 9. As shown in FIG. 9, during the air-cleaning mode, the peripheral wall portion 17a1 of the rotary door 17 closes both the first air outlet 20 and the third air outlet 22, the peripheral wall portion 17a2 of the rotary door 17 fully closes the second air outlet 21 to fully open the fourth air outlet 23. That is, during the air-cleaning mode, only the fourth air outlet 23 is fully opened, while the first air outlet 20, the second air outlet 21 and the third air outlet 22 are closed. Therefore, inside air in the rear space P of the passenger compartment passes through the filter member 4 to be cleaned, and the cleaned air is blown from the fourth air outlet 23 toward the air duct 27 to be introduced into the passenger compartment from the air outlet 50. Thus, when a passenger is smoked in the passenger compartment so that inside air in the passenger compartment becomes dirty, the air-cleaning mode is set to clean the inside air in the passenger compartment.

As described above, in the first embodiment, the first cooler mode, the second cooler mode, the third cooler mode, the exhaust mode and the air-cleaning mode can be selected by the rotation of the rotary door 17. To obtain the various functions, the air outlets 20–23 are provided in the blower case portion 14. In the first embodiment, because the air outlets 20–23 are arranged at the outer peripheral position outer the centrifugal fan 13 in the circumference direction, the size of the blower unit 10 is decreased to reduce the size of the air conditioning apparatus 1 for the rear seat of the vehicle.

In the above-described first embodiment, when the exhaust mode or the air-cleaning mode is set, refrigerant is not supplied to the evaporator 6.

A second preferred embodiment of the present invention will be now described with reference to FIGS. 11–13.

In the second embodiment, another mode (i.e., function) is added as compared with the first embodiment. FIG. 11 shows an entire structure of an air conditioning apparatus 101 for a rear seat of the vehicle. As shown in FIGS. 11 and 12, in the air conditioning apparatus 101, a blower unit 110, an evaporator 106 and a filter member 104 are disposed to be arranged in a front-rear direction of the vehicle. The air conditioning apparatus 101 is disposed on a rear side of the rear seat in the passenger compartment at an offset position shifted from a center to a left side in the width direction of the vehicle. The air conditioning case 101 includes a case 103 for forming an air passage, and the evaporator 106 is disposed in the case 103 to form a bypass passage 108 through which air bypasses the evaporator 106. Similarly to the first embodiment, the bypass passage 108 is opened and closed by a bypass door 109. Further, a filter member 104 is disposed in the case 103 at an upstream air side of the evaporator 106.

In the second embodiment, a rotary shaft 117b of a rotary door 117 is not rotated itself, and is used as a driving pin. That is, the rotary shaft 117b is formed at a position shifted from a rotation center of the rotary door 117. When the rotary shaft 117b is moved (rotated) in an up-down direction (i.e., face-back direction of the paper of FIG. 11) of the vehicle, the rotary door 117 is rotated. The blower unit 110 has a blower case portion 114, and a circular arc-shaped hole (not shown) for guiding the rotation of the rotary shaft 117b is formed on an end surface of the blower case portion 114 at a left side (i.e., vehicle front side) in FIG. 11.

Figure 11:
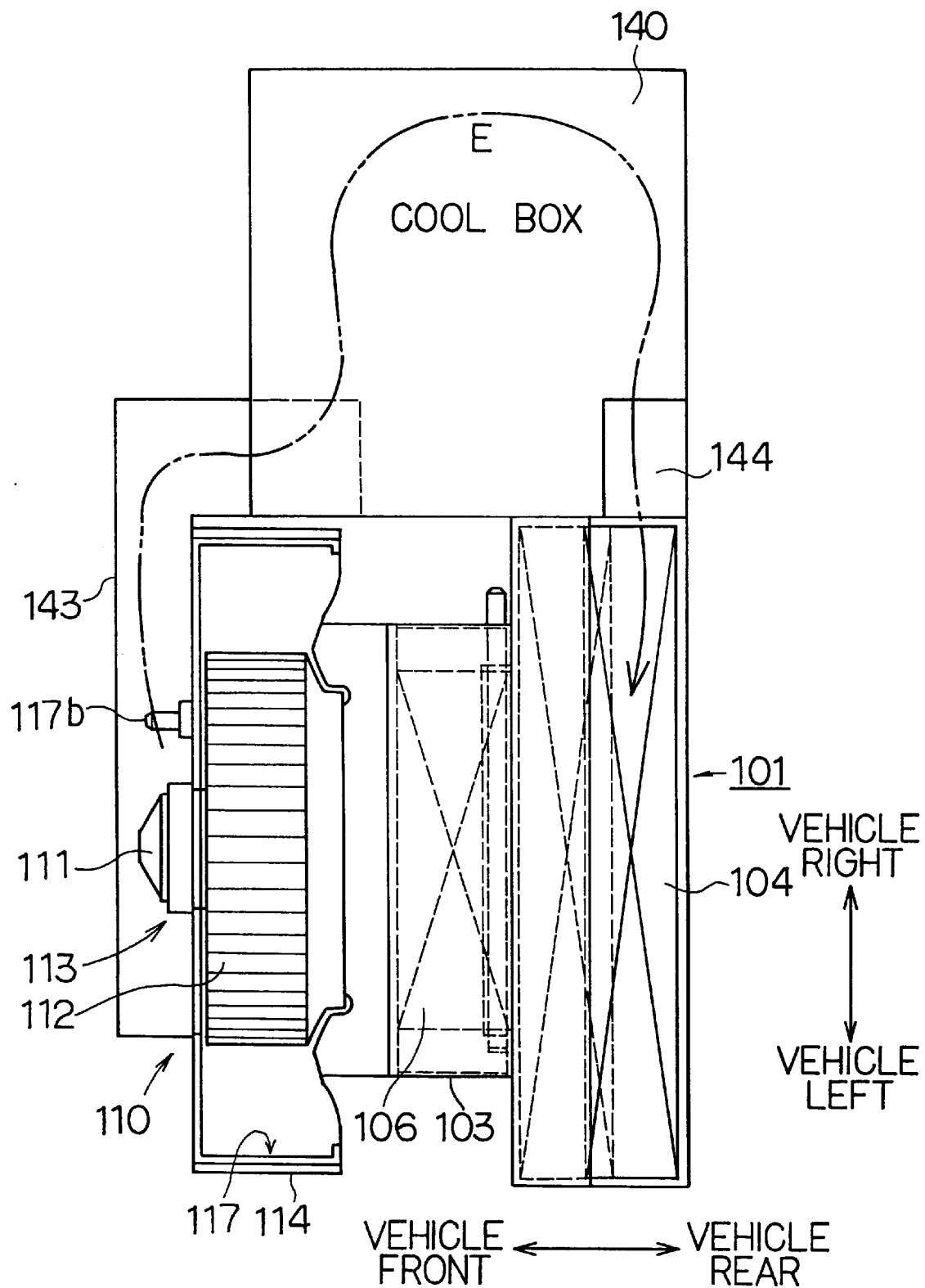
FIG. 11 is a schematic diagram showing an air conditioning apparatus for a rear seat of a vehicle according to a second preferred embodiment of the present invention.
Figure 12:
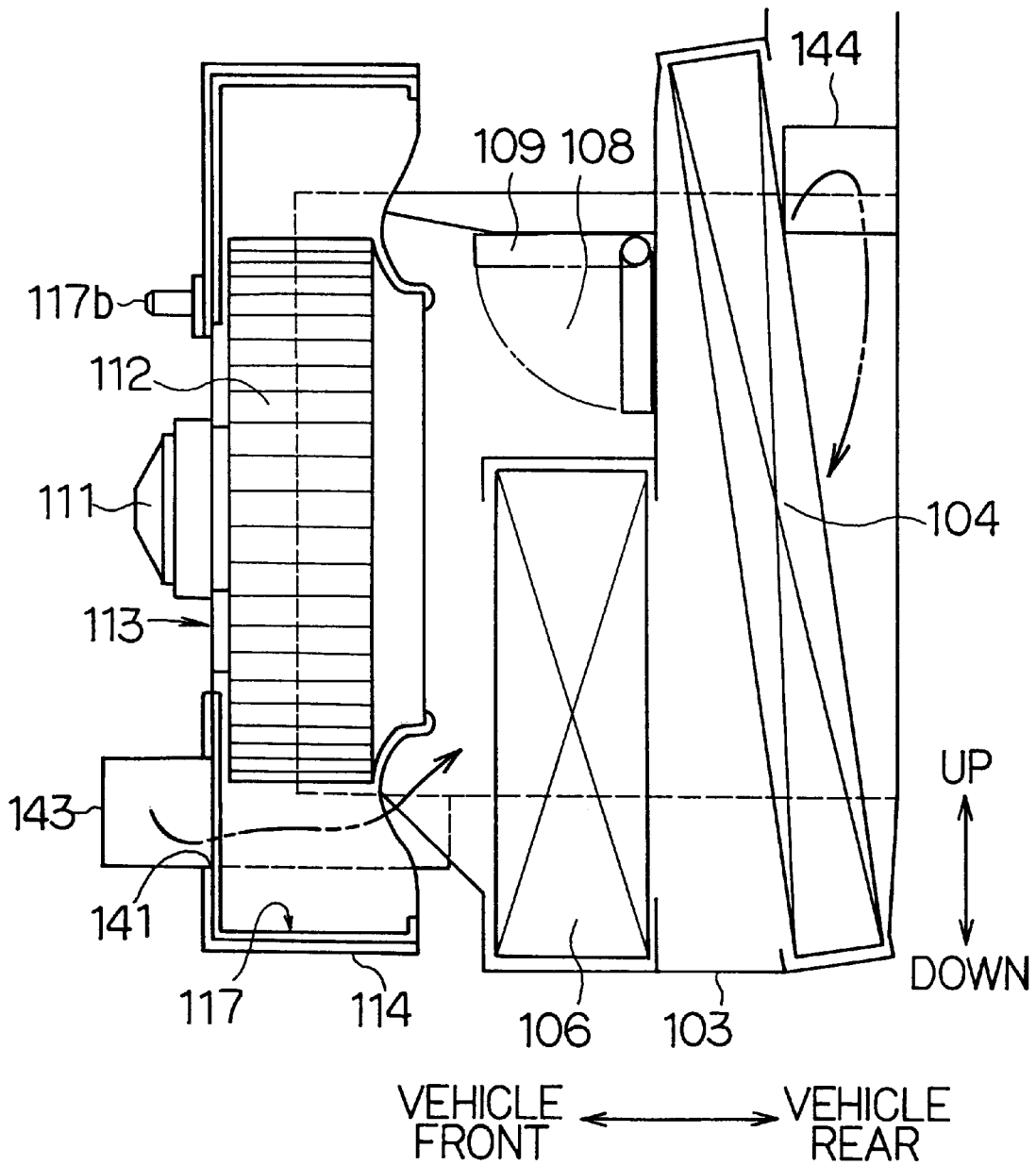
FIG. 12 is side view of the air conditioning apparatus when viewed from a vehicle left side toward a vehicle right side in FIG. 11.

In the second embodiment, as shown in FIG. 11, a cool box (i.e., clod storage) 140 for preserving and cooling foods and drinks is disposed on a right side of the air conditioning apparatus 1 at a center portion in the width direction of the vehicle. Cool air cooled in the evaporator 106 is introduced into the cool box 140 to cool the foods and the drinks within the cool box 140.

The blower case portion 114 is formed in a cylindrical shape, and a first cool-air opening portion 141 for introducing cool air toward the cool box 140 is formed in an one end surface of the blower case portion 114. As shown in FIG. 12, the first cool-air opening portion 141 is formed and opened under a fan 112. Further, the first cool-air opening portion 141 is connected to one end of a duct 143, and the other end of the duct 143 is connected to the cool box 140, as shown in FIG. 13.

Figure 13:
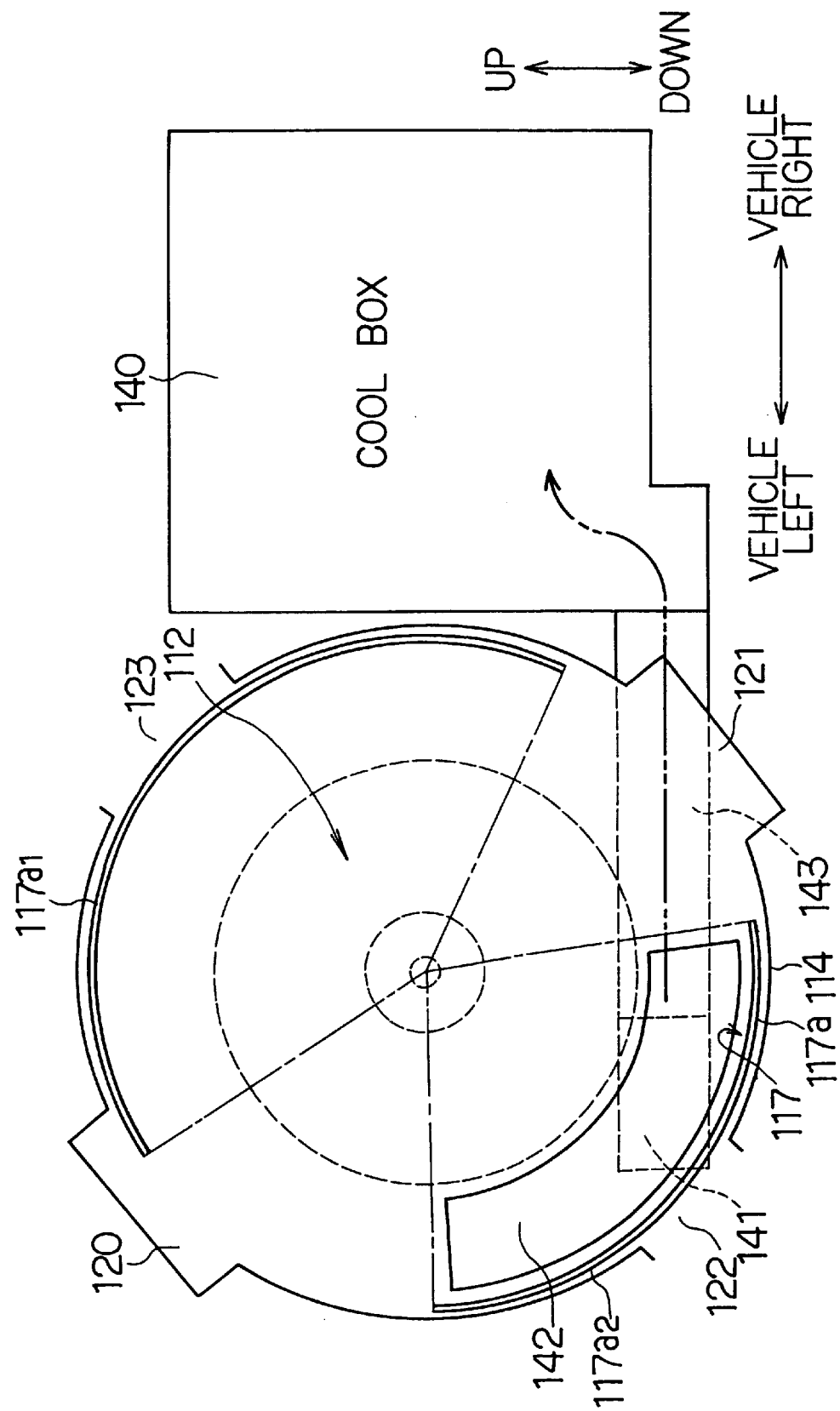
FIG. 13 is a schematic sectional view of the air conditioning apparatus in FIG. 11.

As shown in FIG. 13, a second cool-air opening portion 142 for opening the first cool-air opening portion 141 is formed in one end surface of the rotary door 17 in the rotation axial direction of the rotary door 17. That is, in the second embodiment, when the first cool-air opening portion 141 and the second cool-air opening portion 142 are overlapped with each other, cool air cooled in the evaporator 106 can be blown into the cool box 140 through the duct 143. As shown in FIG. 13, the second cool-air opening portion 142 is formed in a circular arc shape in the rotary door 117 in such a manner that cool air is always blown toward the cool box 140 in the rotation range of the rotary door 117 of the present invention. The cool box 140 is connected to one end of an exhaust duct 144, and the other end of the exhaust duct 144 is connected to an upstream air portion of the filter member 104.

As shown by arrow E in FIG. 11, air having passed through the filter member 104 is cooled in the evaporator 106, is sucked into the centrifugal fan 113, and is blown into the duct 143 through the first cool-air opening portion 141 and the second cool-air opening portion 142. Air from the duct 143 passes through the cool box 140, and flows into again the filter member 104 from the exhaust duct 144.

That is, in the second embodiment, cool air circulates in an air passage circuit in this order of the filter member 104, the evaporator 106, the centrifugal fan 113, the cool box 140 and the filter member 104. Thus, when foods are accommodated in the cool box 140, smell from the foods in the cool box 140 can be removed while passing through the filter member 104.

The other portions in the second embodiment are similar to those in the first embodiment, and the explanation thereof is omitted.

Although the present invention has been fully described in connection with the preferred embodiments thereof with reference to the accompanying drawings, it is to be noted that various changes and modifications will become apparent to those skilled in the art.

For example, in the above-described embodiments, the rotary door 17, 117 is manually operated by a passenger in the passenger compartment. However, the rotary door 17, 117 may be automatically controlled using a servomotor, for example. In this case, according to a sunlight amount entering to the rear space P at left and right sides, the rotary door 17, 117 can be automatically controlled to set a cooler mode.

In the above-described embodiments, the guide portions 28a, 28b are formed integrally with the peripheral wall portions 17a1, 17a2 of the rotary door 17; however, the guide portions 28a, 28b may be formed independently with the peripheral wall portions 17a1, 17a2 of the rotary door 17. In the above-described embodiments, the air conditioning apparatus 1, 101 for the rear seat of the vehicle is a suction type in which the blower unit 10, 110 is disposed at a downstream air side of the evaporator 6, 106. However, the air conditioning apparatus 1, 101 for the rear seat of the vehicle may be a forced draft type in which the blower unit 10, 110 is disposed at a downstream air side of the evaporator 6, 106.

In the above-described embodiments, as an air outlet switching door, the rotary door 17, 117 is used; however, a plate like door may be used. Further, in the above-described embodiments, the air conditioning apparatus 1, 101 is used for the rear seat of the vehicle. However, the air conditioning apparatus 1, 101 may de disposed in an instrument panel at a front side of the vehicle, and may be used for the front seat of the vehicle.

Such changes and modifications are to be understood as being within the scope of the present invention as defined by the appended claims.

What is claimed is:

1. An air conditioning apparatus for a vehicle having a passenger compartment, said air conditioning apparatus comprising:
    a case for forming an air passage, said case having at least first and second air outlets for blowing air toward the passenger compartment;
    a centrifugal fan having a plurality of blades and a circular outer peripheral portion, said centrifugal fan being disposed in said case; and
    a rotary door for opening and closing said first and second air outlets, said rotary door being disposed to simultaneously open both said first and second outlets; wherein
    said first and second air outlets are formed in said case to be arranged in a circumference direction of said centrifugal fan and to face said outer peripheral portion of said centrifugal fan;
    said centrifugal fan is a backward curved fan in which each blade is curved backward relative to a rotation direction of said centrifugal fan;
    each blade has a first end at a most outer side in a radius direction of said centrifugal fan, a second end at a most inner side in the radius direction, and a bent portion between said first end and said second end;
    said first end is disposed at a rear side of said second end relative to said the rotation direction of said centrifugal fan; and
    said bent portion protrudes toward a front side in the rotation direction of said centrifugal fan.

2. The air conditioning apparatus according to claim 1 wherein said rotary door includes a peripheral wall having a circular arc shape in cross section, said rotary door being disposed in said case at an outer side of said outer peripheral portion of said centrifugal fan, said air conditioning apparatus further comprising:
    a guide portion disposed on an inner peripheral surface of said peripheral wall of said rotary door to be rotated integrally with said peripheral wall, said guide portion being disposed in such a manner that a sectional area of an air-blowing passage between said inner peripheral surface of said peripheral wall and said outer peripheral portion of said centrifugal fan is gradually increased along the air-blowing direction.

3. The air conditioning apparatus according to claim 2, wherein air blown from said centrifugal fan is gathered by said guide portion, before being introduced into said first and second air outlets.

4. The air conditioning apparatus according to claim 2, wherein:
    said rotary door opens both said first and second air outlets in such a manner that air is blown from both said first and second air outlets during an air outlet mode;
    said first and second air outlets are formed in said case to have a predetermined interval therebetween in said circumference direction of said centrifugal fan;
    air is blown from said centrifugal fan in an air-blown range having a first air-blown range and a second air-blown range; and
    said air-blowing passage between said inner peripheral surface of said peripheral wall and said outer peripheral portion of said centrifugal fan is divided into a first air-blowing passage and a second air-blowing passage by said rotary door and said guide portion, in such a manner that air blown from said first air-blown range is introduced into said first air outlet through said first air-blowing passage, and air blown from said second air-blown range is introduced into said second air outlet through said second air-blowing passage, during said air outlet mode.

5. The air conditioning apparatus according to claim 4, wherein said first air-blowing passage and said second air-blowing passage are independently formed.

6. The air conditioning apparatus according to claim 4, wherein:
    said first air-blowing passage extends from a forward side of said second air outlet, proximate to the second air outlet, in said rotation direction of said centrifugal fan toward a backward side of said first air outlet, proximate to said first air outlet, in said rotation direction of said centrifugal fan; and said second air-blowing passage extends from a forward side of said first air outlet, proximate to said first air outlet, in said rotation direction of said centrifugal fan toward a backward side of said second air outlet, proximate to said second air outlet, in said rotation direction of said centrifugal fan.

7. The air conditioning apparatus according to claim 6, wherein:

said first air-blowing passage has a sectional area at an upstream air side, the sectional area at the upstream air side of said first air-blowing passage being smaller than a sectional area at a downstream air side of said second air-blowing passage; and said second air-blowing passage has a sectional area at an upstream air side, the sectional area at the upstream air side of said second air-blowing passage being smaller than a sectional area at a downstream air side of said first airblowing passage.

8. The air conditioning apparatus according to claim 4, wherein said rotary door is rotated to adjust a ratio between an amount of air blown from said first air outlet and an amount of air blown from said second air outlet during said air outlet mode.

9. The air conditioning apparatus according to claim 1, wherein each blade of said centrifugal fan has an outlet angle that is an angle between a tangential line of a circular rotation locus of each top end of said blades and an extending line of each blade, said outlet angle being larger than 110° and smaller than 150°.

10. The air conditioning apparatus according to claim 1, further comprising a heat exchanger, disposed in said case at an upstream air side of said centrifugal fan, for cooling or heating air passing therethrough.

11. The air conditioning apparatus according to claim 10, further comprising a filter member, disposed in said case at an upstream air side of said heat exchanger, for filtering air passing therethrough.

12. The air conditioning apparatus according to claim 1, wherein:

said rotary door includes a first rotation portion having a circular arc shaped section, and a second rotation position having a circular arc shaped section; and said first and second rotation portions are disposed in said case to form first and second openings for opening said first and second air outlets, the air conditioning apparatus further comprising:

a first guide portion having an outer peripheral surface being integrated with a first inner peripheral surface of said first rotation portion, and a second inner peripheral surface extending from the first inner peripheral surface of said first rotation portion to an inner side in the radius direction of said centrifugal fan in a direction opposite to the rotation direction of said centrifugal fan; and a second guide portion having an outer peripheral surface being integrated with first inner peripheral surface of said second rotation portion, and a second inner peripheral surface extending from the first inner peripheral surface of said second rotation portion to an inner side in the radius direction of said centrifugal fan in a direction opposite to the rotation direction of said centrifugal fan.

13. An air conditioning apparatus for a rear space in a passenger compartment of a vehicle, said air conditioning apparatus comprising:

a case for forming an air passage, said case having a first air outlet for blowing air toward a left side in the rear space of the passenger compartment, a second air outlet for blowing air toward a right side in the rear space of the passenger compartment, a third air outlet for blowing air toward the rear space in the passenger compartment and a fourth air outlet for discharging air in the rear space of the passenger compartment to the outside of the passenger compartment;

a centrifugal fan for blowing air toward said air outlets, said centrifugal fan having a plurality of blades and a circular outer peripheral portion, and being disposed in said case;

a rotary door including a peripheral wall having a circular arc shape in cross section, said rotary door being disposed in said case at an outer side of said outer peripheral portion of said centrifugal fan, and rotating in a circumference direction of said centrifugal fan to change an air-blowing direction from said centrifugal fan; and a guide portion disposed on an inner peripheral surface of said peripheral wall of said rotary door to be rotated integrally with said peripheral wall, said guide portion is disposed in such a manner that a sectional area of an air-blowing passage between said inner peripheral surface of said peripheral wall and said outer peripheral portion of said centrifugal fan is gradually increased along the airblowing direction, wherein:

said air outlets are formed in said case to be arranged in the circumference direction of said centrifugal fan and to face said outer peripheral portion of said centrifugal fan;

said guide portion gathers air blown from said centrifugal fan, before air is introduced into said air outlets;

said peripheral wall of said rotary door closes both said third and fourth air outlet to open both said first and second air outlets during a cooler mode where air is blown from both said first and second air outlets;

said peripheral wall of said rotary door closes said first air outlet, said second air outlet and said third air outlet to open said fourth air outlet during an exhaust mode where air is blown from only said fourth air outlet; and said peripheral wall of said rotary door closes said first air outlet, said second air outlet and said fourth air outlet to open said third air outlet during an air-cleaning mode where air is blown from only said third air outlet.

14. The air conditioning apparatus according to claim 13, wherein said centrifugal fan is a backward curved fan in which each blade is curved backward relative to a rotation direction of said centrifugal fan.

15. The air conditioning apparatus according to claim 13, wherein:

said first and second air outlets are formed in said case to have a predetermined interval therebetween in said circumference direction of said centrifugal fan;

air is blown from said centrifugal fan in an air-blown range having a first air-blown range and a second air-blown range during said cooler mode; and said air-blowing passage between said inner peripheral surface of said peripheral wall and said outer peripheral portion of said centrifugal fan is divided into a first air-blowing passage and a second air-blowing passage by said rotary door and said guide portion, in such a manner that air blown from said first air-blown range is introduced into said first air outlet through said first air-blowing passage, and air blown from said second air-blown range is introduced into said second air outlet through said second air-blowing passage, during said cooler mode.

16. The air conditioning apparatus according to claim 13, further comprising:
a heat exchanger, disposed in said case at an upstream air side of said centrifugal fan, for cooling air passing therethrough; and
a filter member, disposed in said case at an upstream air side of said heat exchanger, for filtering air passing therethrough.

17. The air conditioning apparatus according to claim 16, wherein:
said case further has a fifth air outlet through which air having passed through said heat exchanger is introduced into a cool box disposed in the vehicle.

18. The air conditioning apparatus according to claim 13, wherein said rotary door is rotated to adjust a ratio between an amount of air blown from said first air outlet and an amount of air blown from said second air outlet, during said cooler mode.

19. The air conditioning apparatus according to claim 13, wherein each blade of said centrifugal fan has an outlet angle that is larger than 90° and is smaller than 150°.

20. A blower unit for blowing air toward a passenger compartment of a vehicle, said blower unit comprising:
a case for forming an air passage, said case having at least first and second air outlets for blowing air toward the passenger compartment;
a centrifugal fan having a plurality of blades and a circular outer peripheral portion, said centrifugal fan being disposed in said case;
a rotary door including a peripheral wall having a circular arc shape in cross section, said rotary door being disposed in said case at an outer side of said outer peripheral portion of said centrifugal fan, and rotating in a circumference direction of said centrifugal fan to open and close said first and second air outlets; and
a guide portion disposed on an inner peripheral surface of said peripheral wall of said rotary door to be rotated integrally with said peripheral wall, said guide portion is disposed in such a manner that a sectional area of an air-blowing passage between said inner peripheral surface of said peripheral wall and said outer peripheral portion of said centrifugal fan is gradually increased along the air-blowing direction, wherein:
said first and second air outlets are formed in said case to be arranged in the circumference direction of said centrifugal fan and to face said outer peripheral portion of said centrifugal fan;
said first and second air outlets are formed in said case to have a predetermined interval therebetween in said circumference direction of said centrifugal fan;
air is blown from said centrifugal fan in an air-blown range having a first air-blown range and a second air-blown range;
said air-blown passage between said inner peripheral surface of said peripheral wall and said outer peripheral portion of said centrifugal fan is divided into a first air-blowing passage and a second air-blowing passage by said rotary door and said guide portion, in such a manner that air blown from said first air-blown range is introduced into said first air outlet through said first air-blowing passage, and air blown from said second air-blown range is introduced into said second air outlet through said second air-blowing passage, during said air outlet mode where said first and second air outlets are opened; and
wherein said guide portion is provided in said rotary door to be tapered at upstream positions proximate to said first and second outlets so that each sectional area of said first and second air-blowing passages is gradually increased toward the rotation direction during the air outlet mode.

21. The blower unit according to claim 20, wherein said centrifugal fan is a backward curved fan in which each blade is curved backward relative to a rotation direction of said centrifugal fan;
each blade has a first end at a most outer side in a radius direction of said centrifugal fan, a second end at a most inner side in the radius direction, and a bent portion between said first end and said second end;
said first end is disposed at a rear side of said second end relative to said the rotation direction of said centrifugal fan; and
said bent portion protrudes toward a front side in the rotation direction of said centrifugal fan.

22. An air conditioning apparatus for a rear space in a passenger compartment of a vehicle, said air conditioning apparatus comprising:
a case forming an air passage, said case having a first air outlet for blowing air toward the rear space in the passenger compartment and a second air outlet for discharging air in the rear space of the passenger compartment to the outside of the passenger compartment;
a centrifugal fan for blowing air toward said air outlets, said centrifugal fan having a plurality of blades and a circular outer peripheral portion, and being disposed in said case;
a rotary door including a peripheral wall having a circular arc shape in cross section, said rotary door being disposed in said case at an outer side of said outer peripheral portion of said centrifugal fan, and rotating in a circumference direction of said centrifugal fan to change an air-blowing direction from said centrifugal fan; and
a guide portion disposed on an inner peripheral surface of said peripheral wall of said rotary door to be rotated integrally with said peripheral wall, said guide portion being disposed in such a manner that a sectional area of an air-blowing passage between said inner peripheral surface of said peripheral wall and said outer peripheral portion of said centrifugal fan is gradually increased along the air-blowing direction, wherein:
said air outlets are formed in said case to be arranged in the circumference direction of said centrifugal fan and to face said outer peripheral portion of said centrifugal fan;
said guide portion gathers air blown from said centrifugal fan, before air is introduced into said air outlets;
said peripheral wall of said rotary door closes said first air outlet to open said second air outlet during an exhaust mode where air is blown from only said second air outlet; and
said peripheral wall of said rotary door closes said second air outlet to open said first air outlet during an air-cleaning mode where air is blown from only said first air outlet.

23. The air conditioning apparatus according to claim 22, wherein:

said case further has a third air outlet for blowing air toward one of a right and a left side in the rear space of the passenger compartment; and said peripheral wall of said rotary door closes both said first and second air outlets to open said third air outlet during a cool mode where air is blown from said third air outlet.

24. The air conditioning apparatus according to claim 23, wherein:

said case further has a fourth air outlet for blowing air toward the other of the right and the left side in the rear space of the passenger compartment; and said peripheral wall of said rotary door closes both said first and second air outlets to open both said third and fourth air outlets during a cool mode where air is blown from said third and fourth air outlets.

25. The air conditioning apparatus according to claim 22, wherein:

each blade has a first end at a most outer in a radius direction of said centrifugal fan, a second end at a most inner side in the radius direction, and a bent portion between said first end and said second end;

said first end is disposed at a rear side of said second end relative to said the rotation direction of said centrifugal fan; and said bent portion protrudes toward a front side in the rotation direction of said centrifugal fan.

26. The air conditioning apparatus according to claim 25, wherein each blade of said centrifugal fan has an outlet angle that is an angle between a tangential line of a circular rotation locus of each top end of said blades and an extending line of each blade, said outlet angle being in a range of 110°–150°.

27. The air conditioning apparatus according to claim 26, wherein said outlet angle is in a range of 120°–150°.

28. The air conditioning apparatus according to claim 26, wherein said outlet angle is in a range of 130°–150°.

29. The air conditioning apparatus according to claim 26, wherein said outlet angle is in a range of 140°–150°.

* * * * *